United States Patent [19]
Kuroda et al.

[11] Patent Number: 4,586,050
[45] Date of Patent: Apr. 29, 1986

[54] AUTOMATIC TRACKING SYSTEM FOR ANTENNA

[75] Inventors: Takao Kuroda; Ryuji Shimizu, both of Tokyo, Japan

[73] Assignee: NEC Corporation, Tokyo, Japan

[21] Appl. No.: 532,606

[22] Filed: Sep. 15, 1983

[30] Foreign Application Priority Data

Sep. 17, 1982 [JP] Japan .......................... 57-141224[U]

[51] Int. Cl.⁴ .......................... G01S 5/02; H04B 7/185
[52] U.S. Cl. .................................... 343/426; 343/352; 343/359
[58] Field of Search ................. 343/426, 422, 359, 352

[56] References Cited

U.S. PATENT DOCUMENTS 4,035,805 7/1977 Mobley .............................. 343/426
4,334,226 6/1982 Eguchi et al. ....................... 343/422

Primary Examiner—Theodore M. Blum
Assistant Examiner—Gregory C. Issing
Attorney, Agent, or Firm—Laff, Whitesel, Conte & Saret

[57] ABSTRACT

An automatic tracking system for an antenna device for satellite communications and using step tracking principles is disclosed which repeatedly effects tracking at predetermined intervals so that the receive electric field from the satellite becomes maximum. When a platform loaded with an antenna device for satellite communications is caused to sway to an inclined position during an interval between sequential tracking operations, sensors senses a pitching angle and a rolling angle of the platform. The outputs of the sensors are compared with an angle previously stored as an inclination angle of the platform which existed just before interval between sequential tracking operations. If the difference is larger than a predetermined value, step tracking is resumed to track the satellite even in a suspension period of step tracking.

5 Claims, 5 Drawing Figures

AUTOMATIC TRACKING SYSTEM FOR ANTENNA

BACKGROUND OF THE INVENTION

The present invention relates to an improvement in an automatic tracking system for constantly orienting an antenna device mounted for satellite communications on a swaying body toward a satellite and, more particularly, to an automatic tracking system for a so-called AZ-EL mount antenna which supports the antenna in vertical and horizontal axes. The swaying body may comprise a platform floating on the sea for the production of petroleum or gas, such as an oil rig.

In an antenna device for satellite communications mounted on a platform of the kind concerned, use is made of an automatic tracking system which automatically keeps the main beam direction of the antenna directed toward a satellite. Such a tracking system is based on so-called hill-climb tracking in which an antenna support is driven to make the receive level from the satellite maximum in an intermittent fashion, that is repeating operation and suspension alternately at predetermined intervals.

As the platform loaded with the step tracking antenna device is caused to sway in any direction, the receive level from the satellite is lowered. Various implementations have heretofore been proposed to make up for the decrease in receive level. One of them employs continuous step tracking instead of the intermittent one, that is, constantly controls the drive of the antenna by the operation and suspension at predetermined intervals and eliminating the intervals between sequential tracking operations. Another is to use a vertical gyro to allow pitching and rolling angles due to the movement of the platform for coordinate conversion, so that the change in angle may be compensated for with respect to each of azimuth (AZ) and elevation (EL) axes while performing continuous tracking.

The constant drive type system, however, causes mechanical portions to wear fast due to the continuous drive and thereby limits the service life of the system. Another drawback is that the continuous drive wastes power for driving motors which are adapted to drive the antenna. The vertical gyro type system, in addition to the limited life due to continuous drive, has various drawbacks such as poor reliability for a long time of operation and the need for an expensive vertical gyro and an intricate coordinate conversion device.

SUMMARY OF THE INVENTION

It is therefore an object of the present invention to provide an improved automatic tracking system which causes an antenna for satellite communications to constantly point at a satellite with accuracy and reliability.

It is another object of the present invention to provide a simple and economical automatic tracking system which allows an antenna for satellite communications to constantly point at a satellite.

It is another object of the present invention to provide a durable, energy saving automatic tracking system which causes an antenna for satellite communications to always point at a satellite.

It is another object of the present invention to provide a generally improved automatic tracking system for an antenna.

An automatic tracking system for an antenna of the present invention includes an antenna for communications with a stationary satellite loaded on a body which sways. The antenna is driven in azimuth and elevation by azimuth drive means and elevation drive means, respectively. A drive control means intermittently drives the drive means such that an electric field which the antenna receives from the satellite becomes maximum. Sensor means senses an angle of inclination when the body sways. Control means stores an angle of inclination of the body occurred during a non-driven period of the intermittently driven azimuth and elevation drive means, compares the angle of inclination with the angle of inclination sensed by the sensor means, and, if a difference provided by the comparison is larger than a predetermined value, causes the drive control means to resume the operation of the azimuth and elevation drive means even when the azimuth and elevation drive means are in a non-driven period.

In accordance with the present invention, an automatic tracking system for an antenna device for satellite communications and using step tracking principles is disclosed which repeatedly effects tracking at predetermined time intervals so that the received electric field from the satellite becomes maximum. When a platform loaded with an antenna device for satellite communications is caused to sway to an inclined position during an interval between sequential tracking operations, a sensor senses a pitching angle and a rolling angle of the platform. The output of the sensor is compared with an angle previously stored as an inclination angle of the platform which existed just before the interval between sequential tracking operations. If the difference is larger than a predetermined level, step tracking is resumed to track a satellite even in a suspension period of step tracking.

The above and other objects, features and advantages of the present invention will become apparent from the following detailed description taken with the accompanying drawings.

DESCRIPTION OF THE PREFERRED EMBODIMENT

While the automatic tracking system for an antenna of the present invention is susceptible of numerous physical embodiments, depending upon the environment and requirements of use, a substantial number of the herein shown and described embodiment have been made, tested and used, and all have performed in an eminently satisfactory manner.

Figure 1:
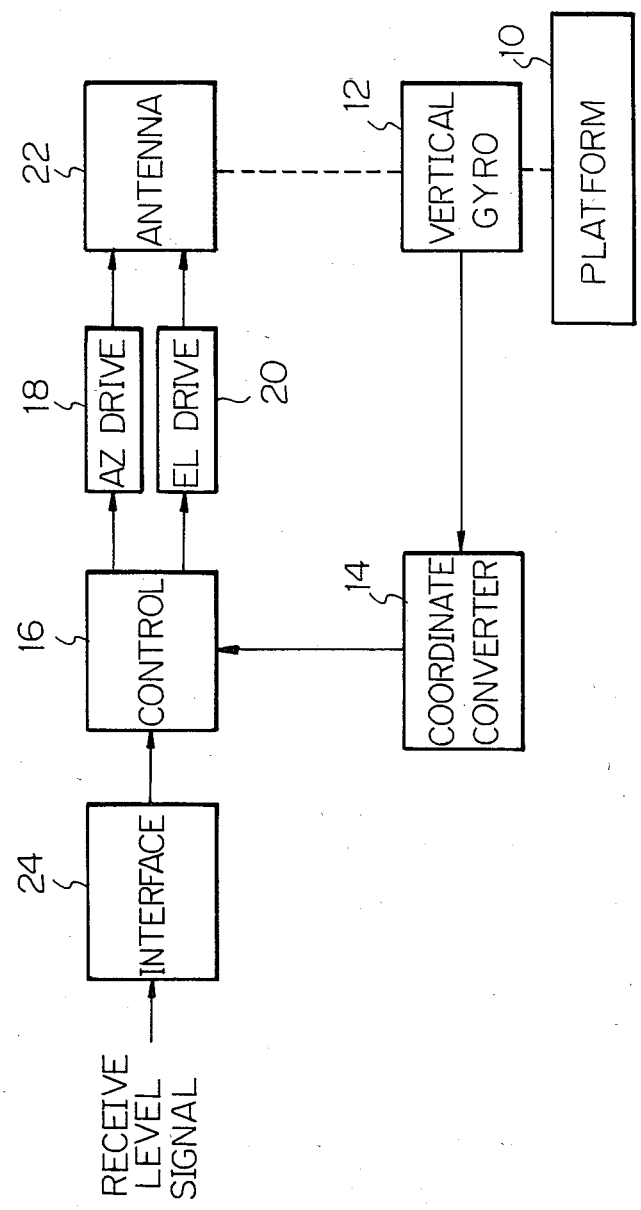
FIG. 1 is a block diagram of an example of prior art automatic tracking systems for antenna.

To facilitate understanding of the present invention, a brief reference will be made to a prior art tracking system of the type using a vertical gyro, illustrated in FIG. 1. The tracking system is associated with a platform 10 which represents a swaying body. A vertical gyro 12 senses a sway of the platform 10 to send out a gyro signal. A coordinate conversion unit 14 processes the incoming gyro signal for coordinate conversion and thereby calculates a required amount of correction in azimuth and/or elevation. A control unit 16, in response to the output of the coordinate converter 14, drives motors included in an AZ drive unit 18 and an EL drive unit 20 which are mounted in the azimuth and elevation axes, respectively. With this construction, an antenna 22 is automatically directed toward a satellite by continuously compensating for the sway of the platform 10. The reference numeral 24 designates an interface which is supplied with a receive level signal.

As previously stated, the above-described tracking system suffers from the drawbacks that a costly vertical gyro is required for sensing the movement of a platform, that the reliability of operation cannot be insured for a long time of use, and that an intricate coordinate conversion unit is indispensable.

Figure 2:
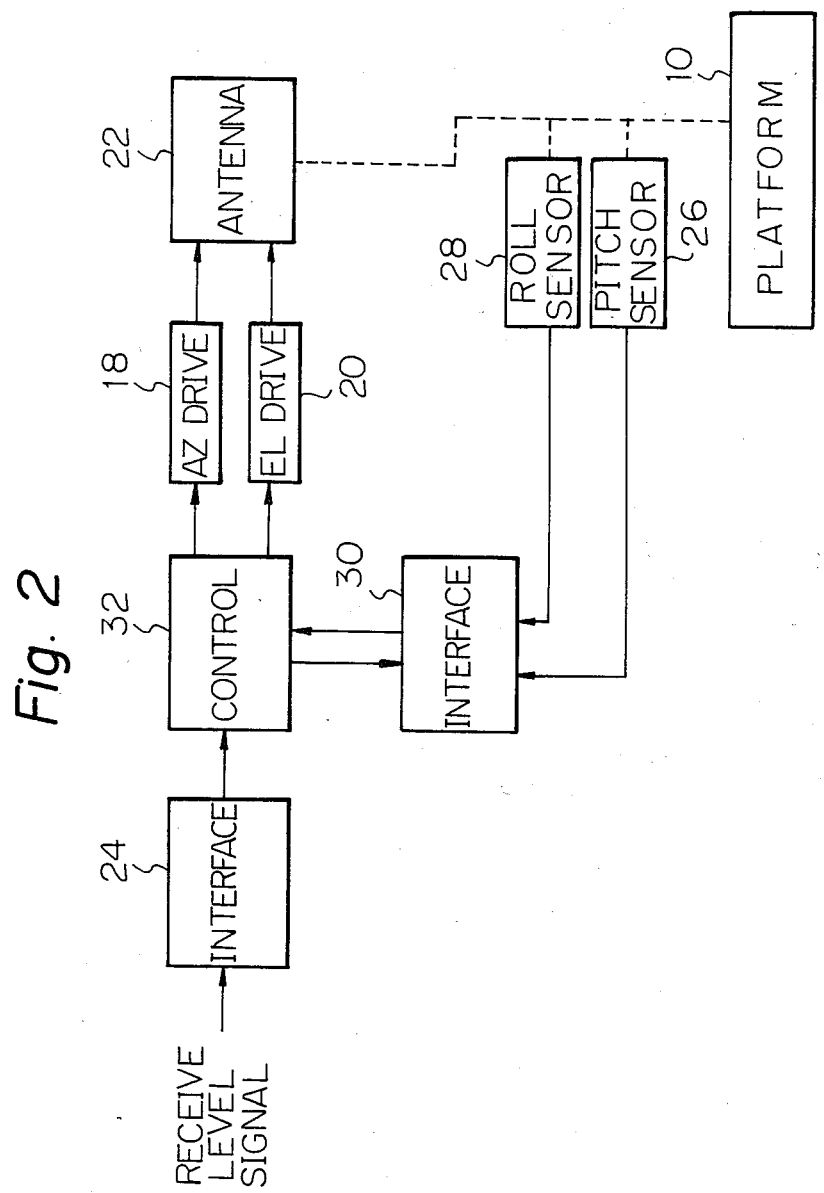
FIG. 2 is a block diagram of an automatic tracking system embodying the present invention.

Referring to FIG. 2, an automatic tracking system embodying the present invention is shown in a block diagram. In FIG. 2, the same reference numerals as those shown in FIG. 1 designate the same or similar structural elements. A characteristic feature of the present invention resides in that the vertical gyro 12 shown in FIG. 1 is replaced by a sensor 26 for sensing pitching of the platform 10 and another sensor 28 for sensing rolling of the same. Other characteristic features are that the coordinate converter 14 shown in FIG. 1 is replaced by a sensor interface 30 to which the sensors 26 and 28 are connected, and that a control unit 32 is employed which includes control logic for step tracking.

Figure 3:
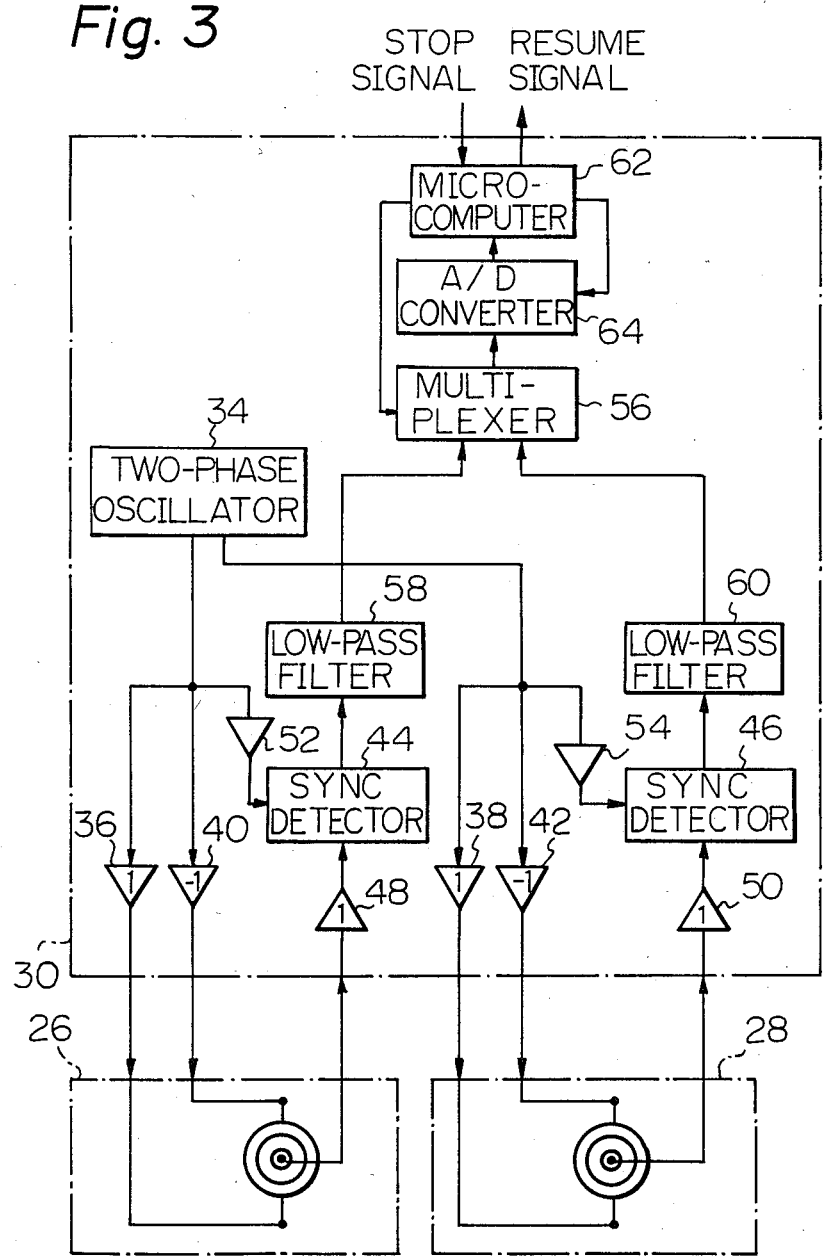
FIGS. 3 and 4 are circuit diagrams showing part of the system of FIG. 2 in detail.

Details of the sensors 26 and 28 and their associated interface 30 are shown in FIG. 3. In FIG. 3, the sensors 26 and 28 individually constitute levels, and the interface 30 includes a two-phase oscillator 34. A signal oscillated by the oscillator 34 and having a sinusoidal waveform is supplied to the levels via buffers 36 and 38 and inversion buffers 40 and 42, thereby allowing positive and negative inclinations of the platform 10 to be sensed. The outputs of the sensors 26 and 28 are respectively connected to synchronous detectors 44 and 46 via buffers 48 and 50. The two-phase oscillator 34 supplies the detectors 44 and 46 with a sync signal for synchronized operation via waveshaping circuits 52 and 54, respectively. The detectors 44 and 46 are individually connected to a multiplexer 56 via low-pass filters 58 and 60. The output of the multiplexer 56 is connected to a microcomputer 62 by way of an analog-to-digital (A/D) converter 64.

Figure 4:
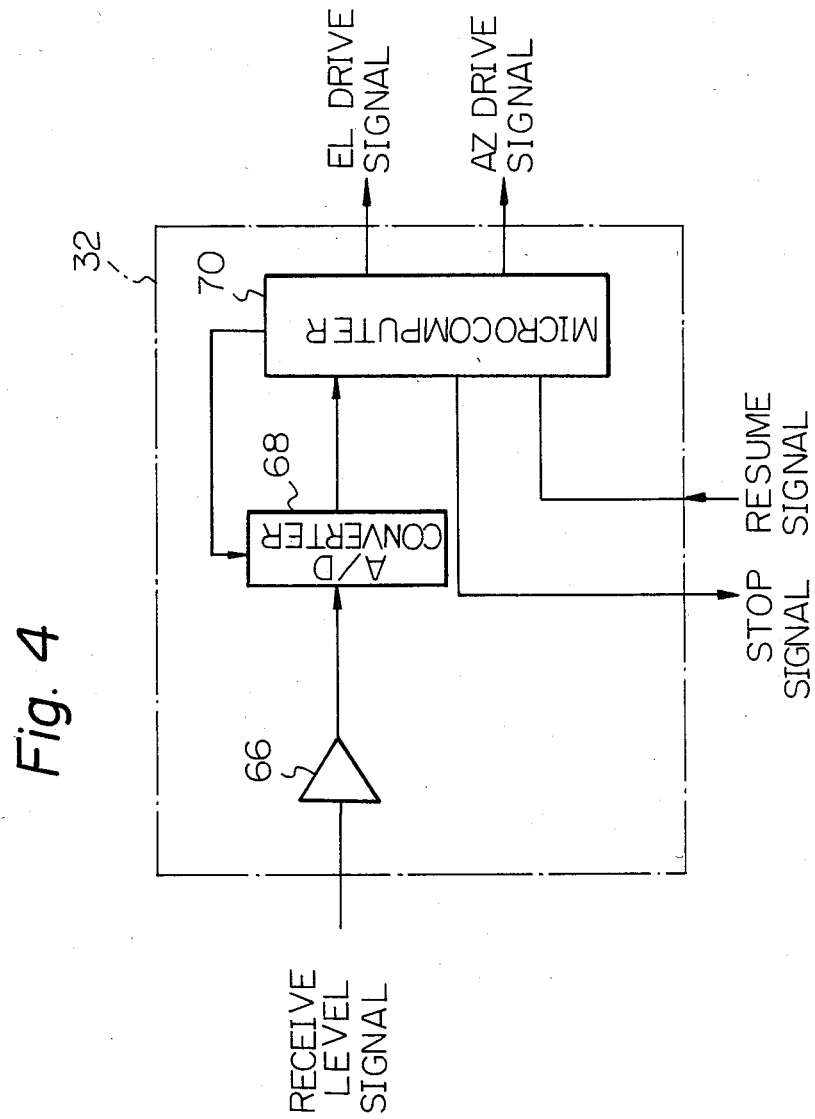

Referring to FIG. 4, the control unit 32 is shown in detail and includes a buffer amplifier 66 which is supplied with an output of the receive level signal interface 24 shown in FIG. 2. The output of the buffer amplifier 66 is connected to an A/D converter 68 the output of which is connected to a microcomputer 70. Also connected to the microcomputer 70 are the input and output of the microcomputer 62 shown in FIG. 3. The output of the microcomputer 70 is connected to the AZ drive unit 18 and EL drive unit 20 shown in FIG. 2.

In operation, the control unit 32 delivers a command for alternately driving the AZ drive unit 18 and EL drive unit 20 such that the receive level, or output of the interface 24, is increased to the maximum. The drive units 18 and 20 are repeatedly operated each at predetermined intervals.

Assume that the platform 10 has inclined during a suspension period of the step tracking operation. Then, one or both of the sensors 26 and 28 deliver signals which correspond to the angle of inclination. In detail, the sensors 26 and 28 are individually supplied with the sinusoidal signal from the two-phase oscillator 34 to be energized at the phases of 0° and 180°. The outputs of the sensors 26 and 28 are respectively passed through the synchronous detectors 44 and 46 to become DC voltage signals which correspond to the inclination of the platform 10. The DC voltage signals are respectively fed to the low-pass filters 58 and 60 and therefrom to the multiplexer 56. The resulting output of the multiplexer 56 is converted by the A/D converter 64 into a digital signal which is then fed to the microcomputer 62.

Figure 5:
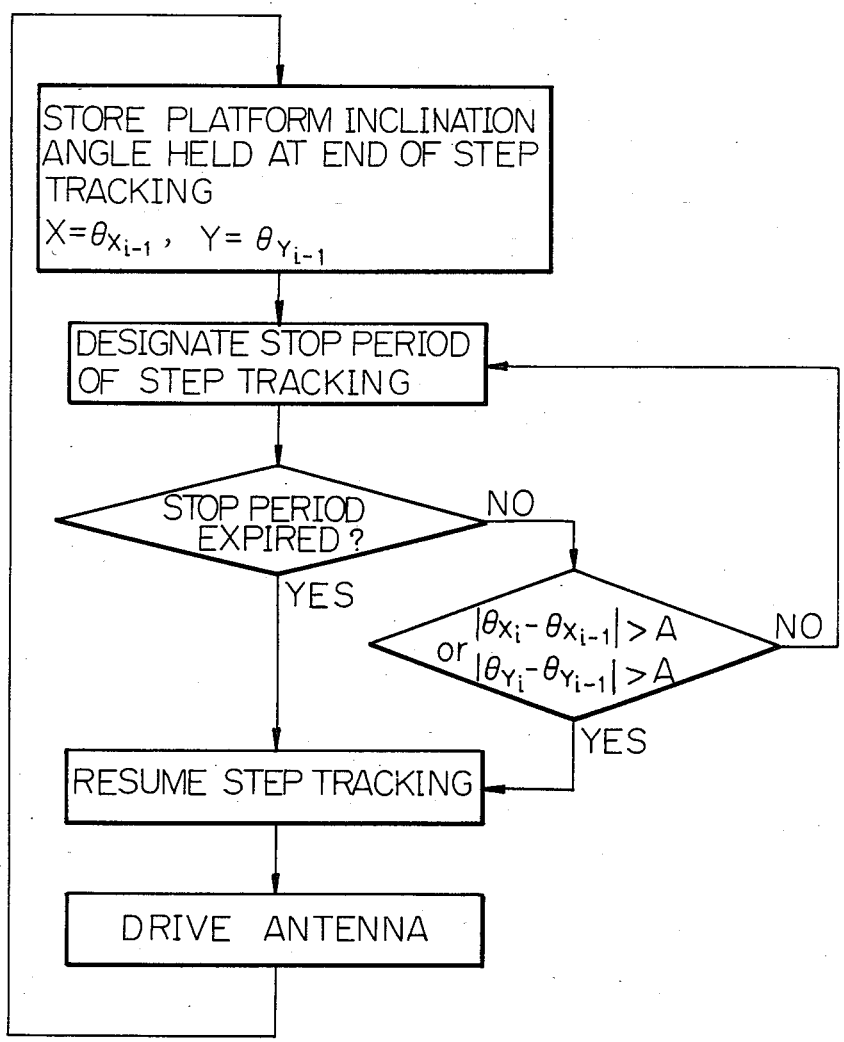
FIG. 5 is a flowchart demonstrating the operation of microcomputers included in the constructions of FIGS. 3 and 4.

As shown in FIG. 5, the microcomputer 62 has stored therein a platform inclination angle (pitching angle $X = \theta_{X_{i-1}}$, rolling angle $Y = \theta_{Y_{i-1}}$) existed at the end of the last step tracking. The microcomputer 62 designates a step tracking stop period and then checks whether or not the stop period has expired. If the stop period has not expired yet, the microcomputer 62 compares the inclination angle ($X = \theta_{X_{i-1}}$, $Y = \theta_{Y_{i-1}}$) with an inclination angle ($X = \theta_{X_i}$, $Y = \theta_{Y_i}$) existed during the stop period. If the difference is larger than a predetermined value A, the microcomputer 62 supplies the control unit 32 with a control signal for resuming step tracking.

For step tracking, the receive level signal is fed through the buffer amplifier 66 of the control unit 32 to the A/D converter 68. The digital output of the A/D converter 68 is delivered to the microcomputer 70 which then repeatedly causes the AZ drive unit 18 and EL drive unit 20 into alternate drives and stops, while observing the receive level.

However, as soon as a step tracking start signal is fed from the interface 30 to the control unit 32, the microcomputer 70 initiates step tracking even in a stop period as shown in FIG. 5. On the start of step tracking, one or both of the AZ drive unit 18 and EL drive unit 20 are driven to point the antenna 22 at a satellite. The inclination angle of the platform 10 then existed is stored in the microcomputer 64.

The function assigned to the sensors 26 and 28 is merely to sense a change in the inclination angle of the platform 10. Therefore, even a level or the like which is susceptible to transverse acceleration is feasible for a sensor in accordance with the present invention.

In summary, it will be seen that the present invention provides an automatic tracking system which is simple in construction, compared to a prior art system which detects a movement angle of a swaying body by the coordinate conversion of an absolute value of the angle. That is, the system of the invention allows the use of an incostly solid-state level as a sensor, instead of a costly precision vertical gyro or the like. Furthermore, so long as the movement of the platform remains smaller than a reference value, continuous tracking is needless as in the case of an antenna device in a fixed ground station, thereby saving such power as required for driving motors.

Various modifications will become possible for those skilled in the art after receiving the teachings of the present disclosure without departing from the scope thereof.

What is claimed is:

1. An automatic step tracking antenna system comprising:
    an antenna for communicating with a stationary satellite supported on a non stabilized body, which may sway;

azimuth drive means and elevation drive means for driving said antenna in azimuth and elevation, respectively;

drive control means for intermittently driving said azimuth and elevation drive means such that an electric field which the antenna receives from the satellite becomes maximum;

sensor means for sensing a present angle of inclination when said body sways, said sensor means comprising a pitching sensor responsive to a pitching angle of the body and a rolling sensor responsive to a rolling angle of the body; and control means for storing an angle of a previous inclination of said body which occurred during a non-driven period of the intermittently driven azimuth and elevation drive means, for comparing said stored angle of said previous inclination with the present angle of inclination sensed by the sensor means, and, if a difference provided by the comparison is larger than a predetermined value, for causing the drive control means to resume the operation of the azimuth and elevation drive means even when the azimuth and elevation drive means are in a non-driven period.

2. The automatic tracking system as claimed in claim 1, in which each of the pitching and rolling sensors comprises a level.

3. The automatic tracking system as claimed in claim 1, in which the control means comprises an interface circuit which includes a microcomputer therein.

4. The automatic tracking system as claimed in claim 1, in which the body comprises a platform.

5. The automatic tracking system as claimed in claim 4, in which the platform comprise an oil rig.

* * * * *